Aug. 29, 1967   I. L. ADLER ETAL   3,338,724
PROCESS FOR PREPARING PUFFED POTATO PRODUCT
Original Filed Aug. 19, 1963

INVENTORS
IRWIN L. ADLER
ALEXANDER APOSTOLINA
By Frederick F. Mack
Michael J. Quillinan
and Walter D. Ames
Attorneys

United States Patent Office

3,338,724
Patented Aug. 29, 1967

3,338,724
PROCESS FOR PREPARING PUFFED
POTATO PRODUCT
Irwin L. Adler, Orangeburg, and Alexander Apostolina, Monroe, N.Y., assignors to General Foods Corporation, White Plains, N.Y., a corporation of Delaware
Continuation of application Ser. No. 303,118, Aug. 19, 1963. This application Aug. 10, 1966, Ser. No. 571,641
5 Claims. (Cl. 99—207)

The present application is a continuation of S.N. 303,118 filed August 19, 1963, now abandoned.

This invention relates to the preparation of dehydrated potatoes, and more particularly to a process for preparing a quick rehydrating puffed potato product and to the product so prepared.

Precooked, dehydrated potatoes have been made by various methods, including puffing methods which make use of gun puffers, fluidized bed heating, and other specialized techniques. In particular, one method of preparing dehydrated potatoes is disclosed in U.S. Patent No. 2,705,679 to Griffiths et al., issued Apr. 5, 1955. This patent discloses the peeling and dicing of potatoes followed by heat treatment with a stream of hot air. The flow of hot air is of sufficient velocity to form a support for the diced potatoes, and essentially forms a fluid bed in which the diced potatoes are agitated due to the velocity of the air stream. This treatment expands or puffs the diced pieces of potato in such a manner that there is separation of the shell of potato formed from the core of the potato pieces. The potato pieces are each puffed or expanded so as to leave the centers of the pieces hollow; i.e., a single, central portion of the core of each potato piece is in the form of a void, which is actually filled with air. The texture of the product so produced is crisp and brittle, and the pieces are stated to be particularly adapted for direct consumption. The bulk density of such products is about 6 to 8 cc./gm., contrasted with less than 4 cc./gm. for conventional dehydrated potatoes.

While the potato pieces produced in accordance with the practice of a process such as that disclosed in the Griffiths et al. patent may be well suited for consumption as snack-type product, the pieces have been found to have relatively poor rehydration properties; the pieces take at least 15 to 30 minutes to recook. It has now been found that a quick cooking or quick rehydrating potato product may be produced which is not greatly expanded to give a light product with a hollow center such as that known to the art. Instead, it is formed with a shell portion and a core portion, the core portion consisting of a matrix of potato meat having a plurality of voids spaced from each other and distributed in the matrix. The product of the present invention has a moisture content not greater than 10%. Preferably, it has a density of 0.15 to 0.20 gm./cc. Separation between the shell and core is slight.

The product of the present invention has rehydration properties that are markedly superior to those of the prior art typified by that disclosed in the Griffiths et al. patent. Thus, it has been found that our dehydrated puffed potato pieces are capable of rehydration within a period of five minutes or less. This distinction may be accounted for by the fact that the pieces are cooked almost uniformly throughout. Owing to the uniformity of cook of the various portions of each potato piece, the core is formed from a plurality of voids, actually air pockets, which may be distributed either in random arrangement throughout the core, or, in another form of the product that has been found to have been produced, in a relationship in which the somewhat elongated voids extend radially outwardly from a central portion of the core. In any case, our product differs from that of the prior art in the fact that there is more than one void in the matrix of potato meat of the core portion of the piece.

The structure of the product of the present invention will be more readily understood by reference to the annexed drawing, which constitutes a part hereof, and in which.

Figure 1:
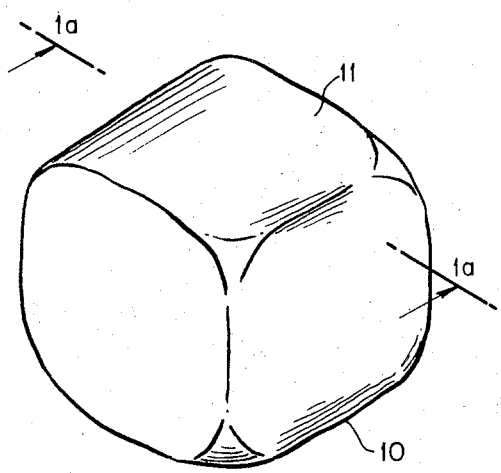
FIG. 1 is a perspective view of one form of the potato piece of our invention.
Figure 1A:
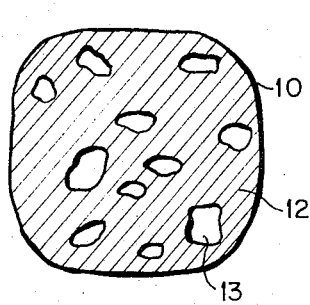
FIG. 1a is a sectional view along the line 1a—1a of FIG. 1.

Referring now to the drawing, and in particular to FIG. 1 thereof, a potato piece substantially cubic in form is illustrated. This potato piece, which is generally identified by reference numeral 10, has six sides 11 each of which is generally square, although it will be appreciated that the potato piece will rarely be in the form of a perfect cube. The potato piece 10 has a heavier shell at its outermost layer and an inner core 12 formed from potato meat. As seen in FIG. 1a, the core 12 has a plurality of voids 13 distributed throughout the matrix of potato meat in a substantially random arrangement, the voids 13 varying as to size and shape.

Figure 2:
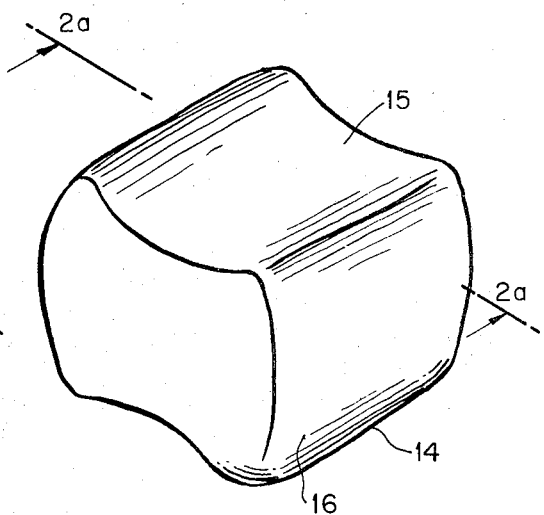
FIG. 2 is a perspective view of another form of a potato piece in accordance with our invention.
Figure 2A:
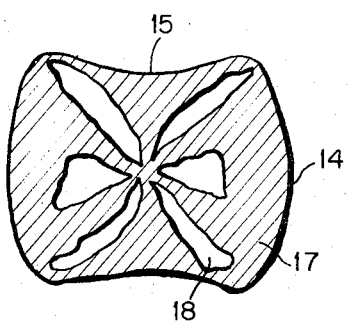
FIG. 2a is a sectional view taken along the line 2a—2a of FIG. 2.

Another form of the product of the present invention is illustrated in FIGS. 2 and 2a. In the perspective view of FIG. 2, the potato piece 14 is formed with two opposed sides 16, which are somewhat puffed outwardly in a generally convex shape, and two opposed sides 15 which lie between opposed sides 16 and are generally concave. Within the piece illustrated in FIG. 2 the thicker shell portion likewise encloses a core of potato meat 17. Within this core there are a plurality of somewhat elongated voids 18. Voids 18 extend outwardly toward the periphery of the potato piece 14 from allocation which is substantially central of the core part of the potato piece.

Either of the forms of potato piece illustrated in FIGS. 1 and 2 can be produced in accordance with the practice of a specific process, which likewise forms a part of the present invention. To produce products such as illustrated in FIG. 1 and 2 in which voids are distributed throughout a matrix of potato meat in the core portion of the piece, potato pieces of a proper size are immersed in a solution of about from 0.1 to 2.0% sodium chloride in water. The immersion takes place at a temperature range of about 170° to 212° F. for a period of about 3 to 15 minutes. The potato pieces are subsequently dried to a moisture content not greater than 10% in a stream of air heated to a temperature of about 310° to 390° F. In order to attain moisture content of less than 10%, has usually been found necessary to dry the pieces in the air stream for about 5 to 20 minutes.

The composition of the aqueous liquid in which the potato pieces are immersed, the drying conditions and the size of the potato pieces, are all important factors in the attainment of a product having a plurality of voids in its core portion, and but slight shell-core separation. The size of the piece, for example, is important in that if the piece is too large, there will be insufficient penetration of sodium chloride into the core portion of the piece and the plurality of voids necessary for the present process will not be formed. It has, for example, been found that if a cubic form of potato piece is used, the maximum dimension of the cube will be ½ inch side. If it is decided to form a potato piece of the shape used in preparing French fried potatoes, two dimensions of the French fried potato piece should not exceed ½ inch; in this case, the third dimension will exceed ½ inch since a conventional French fried potato piece is about 3 inches in length. While it is preferred in some cases that the potato piece be from about ¼ to ⅜ inch in either all three of its dimensions or two of its dimensions, the minimum size of the piece is not critical, since smaller pieces will give the proper heat transfer characteristics which, when coupled with proper presoaking conditions, will yield the desired product.

The amount of sodium chloride in the aqueous solution in which the potato piece of proper size is to be immersed is likewise important. This concentration has been found to vary from 0.1 to 2% sodium chloride in water. Likewise, the time of the so-called blanching treatment and the temperature at which the blanch is effected are critical. It has been found that the range of the temperature of the blanching medium, i.e., sodium chloride in water, may extend from about 170° to 212° F. The time during which the blanching may be effected is about 3 to 15 minutes. Strict control of the sodium chloride concentration, temperature of the blanch medium, and blanch time will result in the desired product.

In order to illustrate the criticality of the factors noted hereinbefore, the following table shows the effect of variations in blanch time on the subsequently produced potato product when other factors are held constant. In this table the percentage of NaCl and the temperature of blanch are held constant at 0.5% and 180° F., respectively. The size in every case is a potato cube ¼ inch in each dimension. The time is altered as are the characteristics of the resulting product.

TABLE I

| NaCl Concentration (percent) | Temperature (° F.) | Time (mins.) | Puffed Product Characteristics |
| --- | --- | --- | --- |
| 0.5 | 180 | 2 | Complete shellcore separation, single central void. |
| 0.5 | 180 | 3 | Slight expansion, plurality of voids. |
| 0.5 | 180 | 4 | Do. |
| 0.5 | 180 | 6 | Do. |
| 0.5 | 180 | 8 | Do. |
| 0.5 | 180 | 10 | Do. |
| 0.5 | 180 | 15 | Do. |
| 0.5 | 180 | 35 | Complete shellcore separation, single central void. |
| 0.5 | 180 | 50 | Do. |
| 0.5 | 180 | 60 | Do. |
| 0.5 | 180 | 120 | Do. |

It will be apparent that there will be a correlation between the salt concentration and the time necessary for effective blanching. Solutions weaker than 0.1% were found to be ineffective in providing suitable porosity. Conversely, it was found that by using salt solutions stronger than 2%, i.e., solutions of about 7% sodium chloride with but one minute of treatment, effective blanching could not be obtained and the final product had a single void at its center and poor rehydrating properties as well as complete shell-core separation. This appears to be due to the fact that a strong blanch for a short period of time serves only to superfically case-harden the surface of the potato without having time to reach the inner potato meat, thereby giving rise to an outer shell which expands greatly to leave an inner core which is hollow. This product has poor rehydration properties. Tests of a 2% salt blanch for 3 to 15 minutes were found to give a usable product, although a plurality of distinct voids in the core portion was not as well developed as in the process in which lesser salt concentrations were utilized. Further, the rehydration properties of the products so produced were less preferred. The most preferable blanch conditions were determined to be a 0.5% sodium chloride-water solution at a temperature of 180° F., immersion of ¼ inch cubes of potatoes being carried out for a period of four minutes.

The dehydration step of the blanched potato pieces is generally known to those skilled in the art, an important feature of this dehydration step being the maintenance of the temperature of the dehydrating medium, e.g., air, at 310° to 390° F. It has generally been found desirable to dehydrate the pieces to a moisture content of no more than 10% at this temperature, although further dehydration may then be required. In order to effect such dehydration, various techniques may be utilized; the fluidized bed process described in the Griffiths et al. patent may be utilized in particular.

In this process, a stream of air heated to a temperature of 310° to 390° F. is directed at a quantity of blanched potato pieces in a confined area at a velocity such that the air will support and agitate the potato pieces. As the potato pieces are tumbled about in the air stream, they are puffed or expanded substantially uniformly. Indeed, it is an important reason for the use of a fluid bed type of drying for puffing that the fluid bed technique does result in a product which is uniformly subjected to contact with the heated air. The puffing apparatus may take the form of stationary, agitating or rotating drums that have a stream of hot air injected into them at great velocity to fluidize potato pieces disposed within the drum. The apparatus may also take the common form of a chamber or inverted cone into which diced or cut potatoes which have been blanched are fed for dehydration.

After it has remained in contact with the heated air for 5 to 20 minutes, the product can be removed by any suitable means and the potato pieces then subjected to further dehydration if it is required so that the final product will have a density of about 0.15 to 0.20 gram/cc. The pieces may be left within the fluid bed until they have achieved this density, or may be separately dried after a fluid bed treatment. Since the purpose of the dehydration process is to achieve a porous core having a plurality of voids spaced from each other in a matrix of potato meat, relatively high heat transfer rates are needed to obtain the desired product.

The temperature range of the heated air with which the blanched potato pieces are treated is a critical feature of the present process. While a range of 310° to 390° F. for about 5 to 25 minutes is allowable, an air temperature of 350° F. will be preferred. The duration of dehydration in a fluid bed at approximately 350° F. will be about 17 minutes. Where the temperature in the fluid bed is lower than about 310° F., it has been found that only partial drying of the potato pieces results and no voids whatsoever will be created within the potato pieces. If too high an air temperature is maintained in the fluid bed, there will be a surface burning of the potato pieces.

The process of the present invention will be better understood by reference to the following description of one specific example thereof.

*Example*

Raw potatoes were peeled and then diced into cubes having a uniform dimension of ⅜ of an inch. These cubes were then immersed in a 0.5% sodium chloride-water solution for 4 minutes, the temperature of the solution being maintained at 180° F. The blanched potato pieces were removed from the solution and fed into a fluid bed drier in the form of an inverted cone and having an air temperature of 350° F. The potato pieces were maintained in the form of a bed by the velocity of the heated air and were permitted to remain in the drier for a period of about 17 minutes after which their moisture content was less than 10%. The dehydrated potato cubes were found to have a structure similar to that illustrated in FIGS. 1 and 1a of the drawing. The core portions of the dehydrated pieces were found to have voids distributed throughout a matrix of potato meat in substantially random arrangement. The entire potato piece had a density of about 0.17 gram/cc.; and were capable of rehydration in less than 5 minutes.

The dehydrated potato products of this invention have been found suitable for rehydration as "French Fries" or hashed brown potatoes, and can easily be recooked within 5 minutes. While they are not generally ready to eat immediately after puffing, they can be briefly heated in a suitable oil to give a tasty product suitable for use as a snack. Various flavoring ingredients may be added to the potatoes by incorporating them in the sodium chloride-water solution used to blanch the pieces. In this manner, the flavor will be absorbed in the porous structure of the core of the potato piece.

It will be apparent that certain alterations, modifications and substitutions in the process and product described hereinbefore will be obvious to those skilled in the art. All such obvious changes are desired to be included within the scope of the present invention, which is to be limited only by the purview of the following, appended claims.

What is claimed is:

1. A process for preparing dehydrated puffed potato pieces, which comprises immersing potato pieces of a size such that at least two dimensions thereof are not greater than ½ inch in a 0.1 to 2.0% sodium chloride-water solution at 170° to 212° F. for 3 to 15 minutes, and then drying the potato pieces to a moisture content not greater than 10% in a stream of air heated to a temperature of 310° to 390° F.

2. A process as claimed in claim 1, in which the potato pieces are immersed in a sodium chloride-water solution at 180° F.

3. A process as claimed in claim 1, in which the potato pieces are immersed in a 0.5% sodium chloride-water solution.

4. A process as claimed in claim 1, in which the potato pieces are immersed in a 0.5% sodium chloride-water solution at 180° F. for 4 minutes.

5. A process for preparing dehydrated puffed potato pieces, which comprises immersing cube-shaped potato pieces each dimension of which is about ¼ inch in a 0.1 to 2.0% sodium chloride-water solution at 170° to 212° F. for 3 to 15 minutes, and then drying the potato pieces to a moisture content not greater than 10% in a stream of air heated to a temperature of 310° to 390° F. for 5 to 25 minutes.

No references cited.

A. LOUIS MONACELL, *Primary Examiner.*

D. NAFF, *Assistant Examiner.*